(12) United States Patent
Lemmens

(10) Patent No.: US 6,425,183 B2
(45) Date of Patent: Jul. 30, 2002

(54) RING CUTTING TOOL

(76) Inventor: Joseph R. Lemmens, 910 S. Salem St., Apex, NC (US) 27502

( * ) Notice: Subject to any disclaimer, the term of this patent is extended or adjusted under 35 U.S.C. 154(b) by 0 days.

(21) Appl. No.: 09/809,413

(22) Filed: Mar. 15, 2001

Related U.S. Application Data

(60) Provisional application No. 60/189,618, filed on Mar. 15, 2000.

(51) Int. Cl.[7] .............................................. B26B 17/00
(52) U.S. Cl. ............................. 30/186; 30/175; 30/142; 30/145; 30/271
(58) Field of Search ........................ 30/175, 176, 177, 30/178, 179, 186, 187, 188, 189, 190, 191, 271, 123, 142, 145

(56) References Cited

U.S. PATENT DOCUMENTS

| | | | | | |
|---|---|---|---|---|---|
| 1,405,028 | A | * | 1/1922 | Stead | 30/175 |
| 2,055,270 | A | * | 9/1936 | Villard et al. | 30/186 |
| 3,196,540 | A | * | 7/1965 | Porzky | 30/271 |
| 6,305,086 | B1 | * | 10/2001 | Burgholzer | 30/186 |

* cited by examiner

Primary Examiner—Hwei-Siu Payer
(74) Attorney, Agent, or Firm—Eric Fincham

(57) ABSTRACT

A ring cutting tool for cutting a ring which encircles tubing, the ring cutting tool having a first member with a jaw at one end and a handle at the other end, a second member having a jaw at one end thereof, and a handle at the other end thereof, the first and second jaws being in a substantially abutting relationship when in a closed position, the jaws providing jaw cutting surfaces which define an angle of between 20° and 35°. The ring cutting tool permits an easy lateral cutting and breaking apart of a compression ring.

10 Claims, 3 Drawing Sheets

RING CUTTING TOOL

The present application claims priority on U.S. Provisional Application Ser. No. 60/189,618 filed Mar. 15, 2000.

FIELD OF THE INVENTION

The present invention relates to improvements in a cutting tool of the plier type which is commonly used to cut various materials of differing shape and hardness.

BACKGROUND OF THE INVENTION

Cutting tools of the plier type similar to the present invention are now in widespread use. Cutting pliers utilizing diagonal and straight jaws are used to cut multiple shapes of various materials. However, when they need to cut a geometric shape such as a ring encircling tubing, the cut needs to be done with the extreme edge of the jaws.

This explains why plumbers and other persons have been using hacksaws for over twenty years to cut off compression rings of medium strength materials such as copper or aluminum. Indeed, many plumbers will cut the flexible pipe and throw away the fittings to avoid the difficulties of cutting a ring with currently available tools.

Other proposed systems to cut these rings have included the use of a roto-tool with a cutting wheel. A tool bit closing tool has also been developed for cutting such rings. These two systems to cut the rings from a water pipe or conduit are more complicated, more costly, and do not provide the capability to extract the ring after it is cut. Also, the devices do not necessarily provide multiple size cutting capability.

SUMMARY OF THE INVENTION

It is an object of the present invention is to provide a simple, reliable, and versatile hand tool which permits plumbers and other users to cut a copper or similar ring surrounding a conduit when such action is needed. Examples of the use of such rings include their use on current water lines, cutting off plugs after pressure testing, or dismantling a fitting.

A second object of the present invention is to provide a ring cutting tool in which the jaws and cutting edge geometry permit an easy lateral cutting and breaking apart of a compression ring in a first motion, and its pulling away from the pipe in a second motion.

A third object of the present invention is to permit the operator of the tool to pull off the cut ring through a second operation simply by using the ring cutting tool to "bite" the ring near the cut area and pull on the tool to unroll and free up the ring.

A fourth object of the present invention is to provide a ring cutting tool which can be used with any size of ring since the cut is done laterally from edge to edge. A still further object of this invention is to combine the previous noted advantages of the ring cutting tool which incorporates other functions such as a hammer, wire cutters, pliers, etc.

A still further object of the present invention is to provide a ring cutting tool which can be manufactured in a similar manner as current plier tools.

According to one aspect of the present invention, there is provided a ring cutting tool suitable for cutting a ring from tubing, the ring cutting tool comprising a first member having a first member jaw at one end thereof and a first member handle at an opposed end thereof, a second member having a second member jaw at one end thereof and a second member handle at an opposed end thereof, the first jaw having a first jaw cutting surface formed thereon, the second jaw having a second jaw cutting surface formed thereon, the first and second members being pivotably connected together such that the first jaw cutting surface and the second jaw cutting surge can move from a first spaced apart position to a second position wherein the jaw cutting surfaces are in a substantially abutting relationship and the first jaw cutting surface and the second jaw cutting surface defining an angle of between 20° and 35° when in the second position.

The cutting tool of the present invention may have the same general characteristics of current cutter pliers providing a mechanical advantage of 5 to 7, where 40 to 50 lbs. of handle pressure provide 200 to 350 lbs. of force at the tip of the jaws, which is sufficient to cut through any copper ring used currently in flexible water line. Those copper rings with a thickness of 0.050 inch to 0.060 inch and a width of 5/16 inch to 3/8 inch may easily be cut by the tool of the present invention with a single closure of the jaw across the ring.

As aforementioned, the ring cutting tool of the present invention is suitable for cutting rings surrounding a conduit. In order to achieve the above, the blades have a geometry which permits the blades to bite into the ring and not slip therefrom.

It is preferred that the jaw cutting surfaces, in the preferred embodiment, and when in a closed relationship, define an angle of between 20° and 35°. Even more preferably, the angle is between 25° and 30°. It is also preferred that the edges of the jaw adjacent the conduit slope backward therefrom to provide sufficient clearance. The angle of slope is preferably between 5° and 25° and even more preferably, between 8° and 15°.

The ring cutting tool of the present invention may incorporate many conventional abilities therein. Thus, the two jaws may have the capability of functioning as a hammer and/or claw. Even further, there may be provided the capability, as will be discussed in the preferred embodiments, of the tool functioning as a wire cutter, a conventional plier, etc.

BRIEF DESCRIPTION OF THE DRAWINGS

Having thus generally described the invention, reference will be made to the accompanying drawings illustrating an embodiment thereof, in which:

FIG. 3b is a front view of the ring cutting tool of FIG. 3a;

FIG. 3c is a view along line 2—2 of FIG. 3a; and

DESCRIPTION OF THE PREFERRED EMBODIMENTS

Figure 1A:
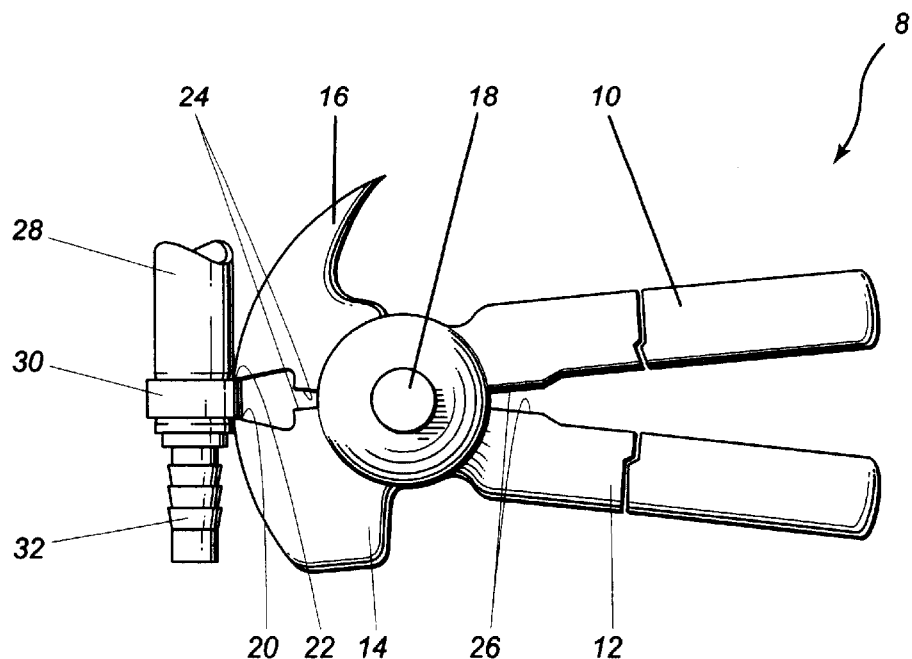
FIG. 1a is a side view of a ring cutting tool in accordance with a first embodiment of the invention, the tool being shown ready to cut a ring.
Figure 1B:
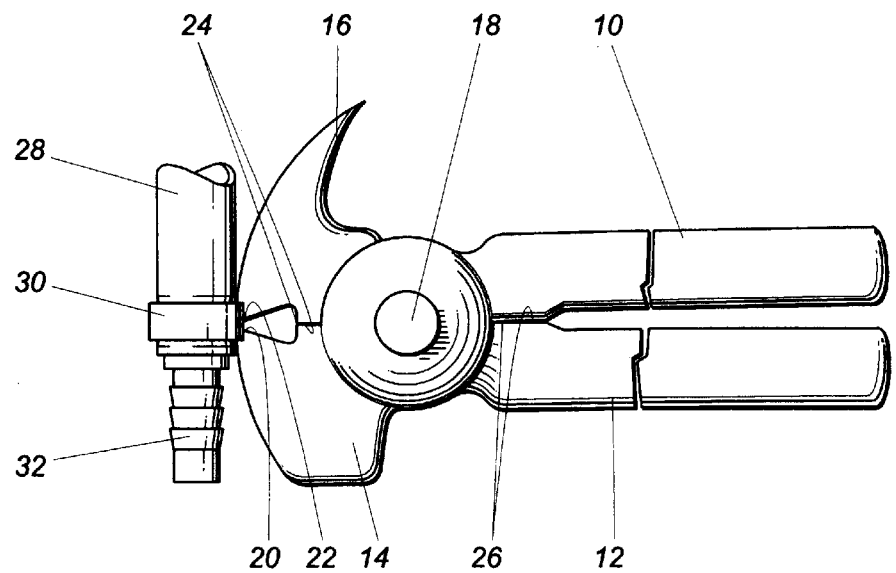
FIG. 1b is a side view of the ring cutting tool of FIG. 1a after cutting through the ring.
Figure 1C:
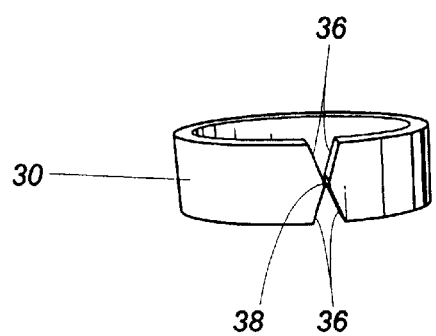
FIG. 1c is a top view of the ring after it has been cut.

A first embodiment of the ring cutting tool of the present invention is shown in FIGS. 1a to 1c and will now be referred to in greater detail. FIG. 1a is a side view of a portion of tool 8 that is positioned to start cutting a ring 30. FIG. 1b shows the ring cutting tool in its fully closed position at the end of the cutting operation. FIG. 1c shows the cut copper ring after the ring cutting tool is reopened and pulled away from the ring.

The ring cutting tool 8 shown in FIG. 1a has a configuration that is customary in most medium and heavy duty plier-type tools. A first member is comprised of a handle 10 and a hammer jaw 14 and a second member is comprised of a handle 12 and a puller jaw 16; the two members are operatively connected through a fastener 18. Fastener 18 is a heavy rivet pin or alternatively could be a hardened bolt and locknut. Cutting edges 20 and 22 are provided on jaws 14 and 16 respectively. As will be discussed hereinbelow, the geometry and hardness of these cutting edges are important in providing the cutting capability of tool 8. Front stoppers 24 and rear stoppers 26 are provided to limit the rotational closure of the jaws 14 and 16 and therefore prevent the cutting edges 20 and 22 from contacting each other.

The fabrication of the ring cutting tool 8 may be similar to that of many plier-type tools. First, an alloy or carbon steel is cast or forged. Then machining is performed while the steel is in a soft temper (well annealed). The tool is then hardened and tempered in order to achieve Rockwell C hardness of around 54–58. This is followed by an application of black oxide or other rust prevention treatment. The final steps in the fabrication of the ring cutting tool are grinding and sharpening the cutting edges, polishing, coating the handles for comfort (plasticoat), and assembling (using rivets or a bolt and nut assembly). The front clearance, edge angle, backward slope of the cutting angle and tool hardness are features of the present invention that will be discussed hereinbelow and that facilitate easy repetitive cutting of any size copper ring or other similar connection use a flexible pipe. All fabrication mods and techniques used in the construction of the ring cutting tool are current technologies.

Figure 2A:
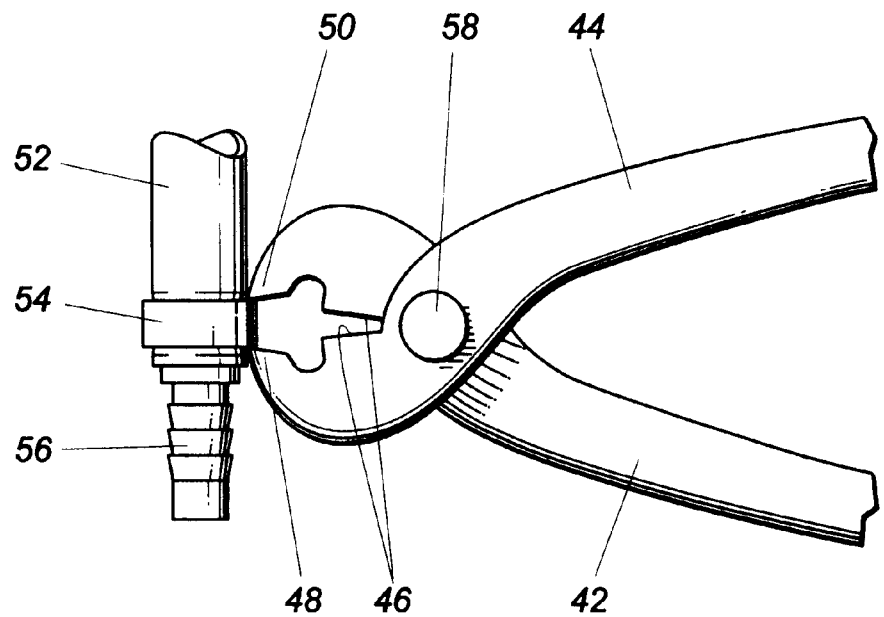
FIG. 2a is a side view of a ring cutting tool prior to cutting a ring in accordance with a second embodiment of the present invention.
Figure 2B:
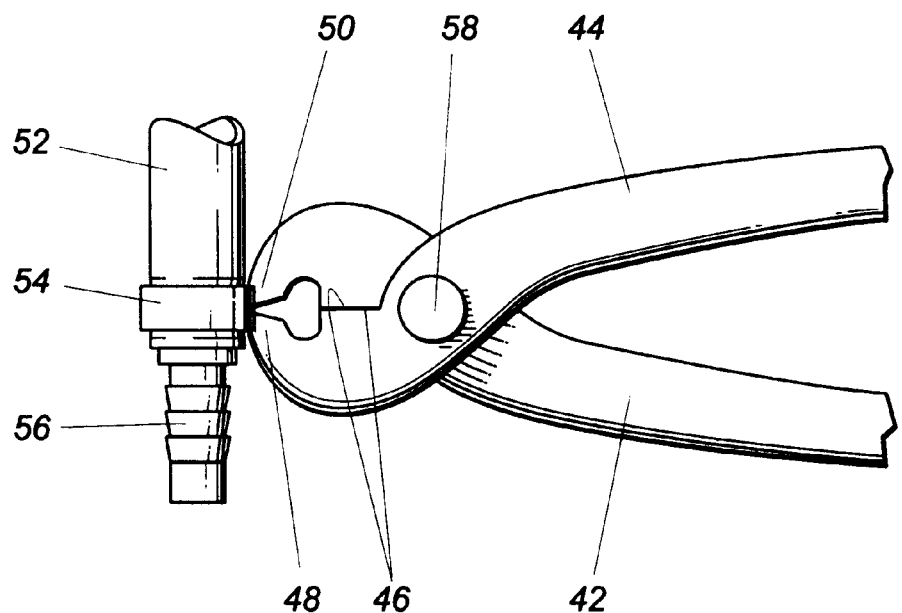
FIG. 2b is a side view of the ring cutting tool of FIG. 2a after cutting through the ring.

A second embodiment of the present invention is shown in FIG. 2a which is a side view of the ring cutting tool at the start of the ring cutting operation. FIG. 2b shows a side view of the second embodiment of the tool at the end of the cutting stroke. This embodiment is a lighter and simpler ring cutting tool than the first embodiment. There is no hammer or puller jaw in this configuration.

The ring cutting tool of FIG. 2a has two handles 42 and 44 directly connected to cutting edges and jaws 50 and 48 respectively. Arm 42 and jaw 50 are operatively connected to arm 44 and jaw 48 by a fastener 58. Stopper surfaces 46 are shown apart since the ring cutting tool is open at the start of the ring cutting operation.

Pipe fitting 56 is fitted inside a flexible pipe 52 and is shown being sealed around fitting 56 by a copper ring 54 which has been previously crimped. The ring cutting tool is shown pressing against the flexible pipe 52 in order to achieve a clean cut.

This second embodiment of the ring cutting tool is shown as a side view in FIG. 2b when the tool has cut through the copper ring 54. Handles 40 and 42 are now in closed position, as are the jaw and cutting edges 48 and 50. Stopper surfaces 46 are now abutting each other.

Fabrication of the tool shown in FIG. 2a is similar to the main embodiment shown in FIG. 1a.

Figure 3A:
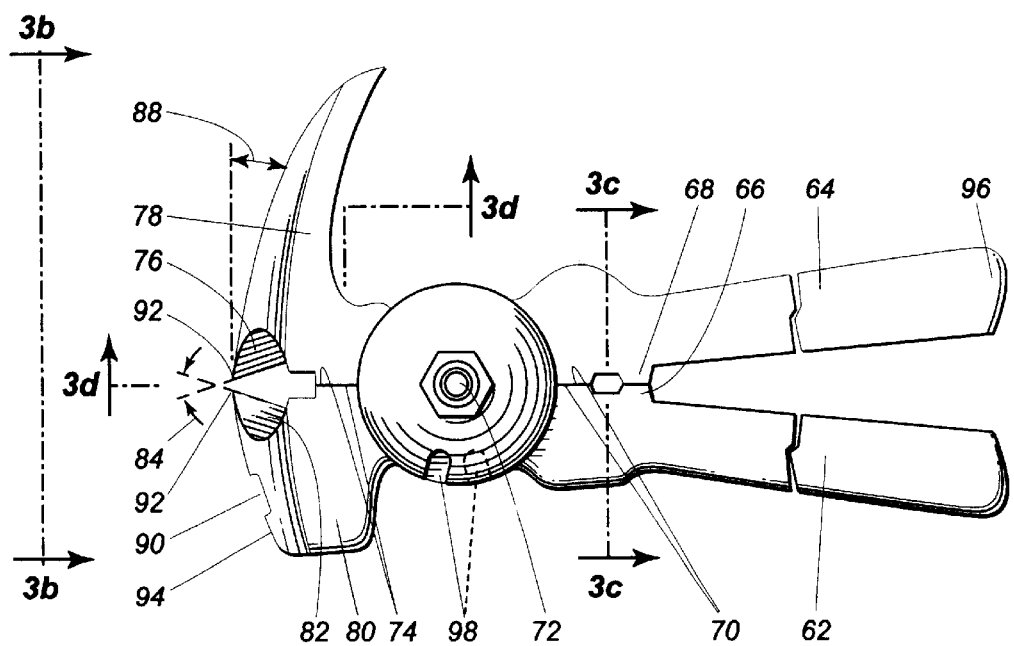
FIG. 3a is a side view of a ring cutting tool in accordance with a third embodiment of the invention.
Figure 3B:
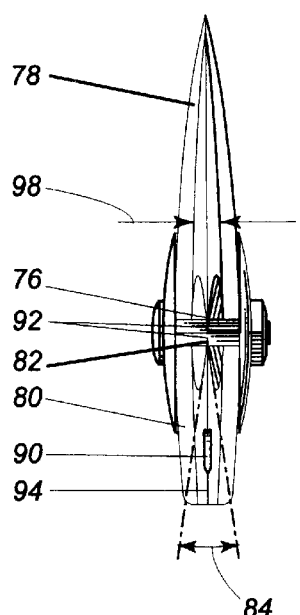
Figure 3C:
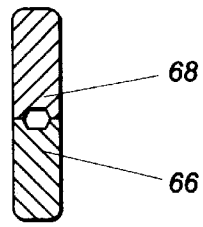
Figure 3D:
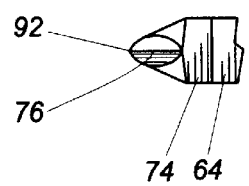
FIG. 3d is a view along line 3—3 of FIG. 3b.

A third embodiment of the ring cutting tool incorporates three extra features: a wire cutting capability, a rear plier capacity, and a ring punching cavity. This embodiment is shown in FIG. 3a which is a side view of the ring cutting tool. A front view of the jaws along line 1—1 is shown in FIG. 3b. A cross section of the rear plier jaws is shown in FIG. 3c along the line 2—2. FIG. 3d shows a view of the cutting edge along line 3—3 of FIG. 3b.

The ring cutting tool of FIG. 3a following a third embodiment has two handles 62 and 64 directly connected to jaws 78 and 80. These two parts of the ring cutting tool are operatively connected and are held together with precision by a bolt and locknut fastener 72. Handle 64 is directly linked to hammer jaw 80 and directly in line with cavity 90 and hammering handle end 96. A cutting edge 70 provides a wire cutting capability. Notches 98 allow the tool to cut heavy wire. This embodiment has rear plier capability through jaws 66 and 68. One other feature of the third embodiment is the ring cavity 90 with punching edges 94 which allows the plumber to deform the flexible tubing before attempting to cut the copper ring when needed.

Stopper surfaces 74 prevent the front jaws from completely closing and damaging the cutting apex 92 of cutting edges 76 and 82. Cutting edges 76 and 82 require a cutting angle 84 of around 20° to 35°. It is to be noted that the cutting jaws have a front clearance shown by number 88 which preferably is between 5 and 20° and even more preferably between 8° and 15°.

As seen in FIG. 3a, there is an upper claw jaw 78 and a lower hammer jaw 80 having cutting edges 76 and 82 respectively. The front view of the tool shows the narrow edges 94 and the cavity 90. The width of the cutter edge 94 is preferably between 0.01 and 0.10 inches. The angle of the cutting edges 76 and 82 as above mentioned is indicated by the extended lines 84 and is preferably between 20° to 35° and more preferably between 25° to 30°.

FIG. 3c shows a cross section of the double jaws 66 and 68 along line 2—2 of FIG. 3a. Details of the cutting edge 76 of jaw 78 are shown in FIG. 3d, taken along line 3—3 of FIG. 3b. Shown in this figure are the rotating section of handle 64, the stopper surface 74, the cutting edge 76, and apex of the cutting edge 92.

The fabrication of the third embodiment of the invention is similar to the first and second embodiments.

The ring 30 to be cut and removed is shown in FIG. 1a. The flexible pipe 28 is engaged around the fitting 32, and the copper ring 30 has been previously crimped to seal the flexible pipe 28 to the fitting 32. To begin the ring cutting operation, the tool 8 is held in an open position. FIG. 1a shows a side view of the tool positioned to start the ring cutting operation. The cutting edges of the tool are pressed against the flexible tubing with the copper ring between the apex of the cutting surfaces. The tool handles 10 and 12 are pressed together with approximately 50 to 60 lbs. of pressure. As the handles are closed, the tool can be twisted to open the ring up to around ¼". FIG. 1b shows the ring cutting tool 8 in a fully closed position at the end of the cutting operation. FIG. 1c shows the cut copper ring after the ring cutting tool is reopened and pulled away from the ring. Surfaces 36 show the cuts done by cutting edges 20 and 22. There is a deformation angle of between about 20° to 40° which is approximately the same as the angle of the cutting edges. A center surface 38 is very small, around 10% of the original width of the ring. This surface is not cut, but broken away from the other side by the closure of the tool.

The cutting edge of the tool can be used to cut the copper ring in a second place, causing the ring to fall off in two pieces. Or, instead of cutting the ring twice, after the first cut, the front cutting jaw can be used as an ordinary plier t bite into one side of the ring and simply pull it farther open and remove it. An ordinary screwdriver can also be used to pull the ring off after the first cut.

While several embodiments of the invention have been shown and described, it is to be clearly understood that the invention is not to be limited to the exact construction illustrated and described. But instead, that many alterations and modifications are possible in the practice of this invention without departing from the spirit or scope thereof. Accordingly, the scope of the invention is to be construed in accordance with the substance defined by the following claims.

I claim:

1. A ring cutting tool suitable for cutting a ring from tubing, said ring cutting tool comprising:

a first member having a first member jaw at one end thereof and a first member handle at an opposed end thereof, a second member having a second member jaw at one end thereof and a second member handle at an opposed end thereof;

said first jaw having a first jaw cutting formed thereon, said second jaw having a second jaw cutting edge formed thereon; each of said jaw cutting edges being formed at respective ends of said jaws;

said first and second members being pivotably connected together such that said first jaw cutting edge and said second jaw cutting edge can move from a first spaced apart position to a second position wherein a portion of each of said jaw cutting edges are in a substantially abutting relationship; and said first jaw cutting edge and said second jaw cutting edge defining an angle therebetween of about 20° and about 35° when in said second position.

2. The ring cutting tool of claim 1 wherein said first and second members are pivotably connected together proximate said first member jaw and said second member jaw.

3. The ring cutting tool of claim 1 wherein said first and second members are pivotably connected together by means of a rivet.

4. The ring cutting tool of claim 1 wherein said first and second members are pivotably connected together by a bolt and locknut assembly.

5. The ring cutting tool of claim 1 wherein said angle is between 25° and 30° when in said second position.

6. The ring cutting tool of claim 5 wherein each of said first jaw cutting edge and said second jaw cutting edge have a cutting width of between 0.01 inch to about 0.10 inch.

7. The ring cutting tool of claim 1 wherein said jaws have a clearance angle of between 5° and 20° when in said second position.

8. The ring cutting tool of claim 1 wherein said first member jaw and said second member jaw include one cutting means.

9. The ring cutting tool of claim 7 wherein said clearance angle is between 8° and 15°.

10. The ring cutting tool of claim 1 further including stopping means to prevent said first jaw cutting edge and said second jaw cutting edge from contacting each other when in said substantially abutting relationship.

* * * * *

UNITED STATES PATENT AND TRADEMARK OFFICE
CERTIFICATE OF CORRECTION

PATENT NO.    : 6,425,183 B2
DATED         : July 30, 2002
INVENTOR(S)   : Joseph R. Lemmens It is certified that error appears in the above-identified patent and that said Letters Patent is hereby corrected as shown below:

<u>Drawings,</u>
Figure 3B, "reference numeral 84" should read -- reference numeral 86 --.

Signed and Sealed this

Nineteenth Day of November, 2002

*Attest:*

*Attesting Officer*

JAMES E. ROGAN
*Director of the United States Patent and Trademark Office*

UNITED STATES PATENT AND TRADEMARK OFFICE
CERTIFICATE OF CORRECTION

PATENT NO. : 6,425,183 B2
DATED : September 30, 2002
INVENTOR(S) : Joseph R. Lemmens It is certified that error appears in the above-identified patent and that said Letters Patent is hereby corrected as shown below:

Column 4,
Line 26, "Figure 3a" should read -- Figure 3b --.

Signed and Sealed this

Third Day of December, 2002

JAMES E. ROGAN
*Director of the United States Patent and Trademark Office*